(12) United States Patent
Nakahara et al.

(10) Patent No.: US 6,989,879 B1
(45) Date of Patent: Jan. 24, 2006

(54) LIQUID CRYSTAL PANEL AND METHOD OF FABRICATING THE SAME

(75) Inventors: Hiroki Nakahara, Shiojiri (JP); Hideki Uehara, Chino (JP); Takashi Miyazaki, Matsumoto (JP); Takeshi Hagiwara, Matsumoto (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 09/530,122

(22) PCT Filed: Aug. 11, 1999

(86) PCT No.: PCT/JP99/04364

§ 371 (c)(1),
(2), (4) Date: Apr. 20, 2000

(87) PCT Pub. No.: WO00/13059

PCT Pub. Date: Mar. 9, 2000

(30) Foreign Application Priority Data

Aug. 31, 1998 (JP) ................................ 10-246032

(51) Int. Cl.
*G02F 1/1337* (2006.01)
*G02F 1/1339* (2006.01)

(52) U.S. Cl. ...................... 349/123; 349/153; 349/190
(58) Field of Classification Search ................. 349/123, 349/124, 153, 190, 149
See application file for complete search history.

(56) References Cited

U.S. PATENT DOCUMENTS

| | | | | |
|---|---|---|---|---|
| 4,391,491 A | * | 7/1983 | Freer et al. .................. 350/341 |
| 4,759,614 A | * | 7/1988 | Yokokura et al. ........ 350/350 S |
| 5,150,239 A | * | 9/1992 | Watanabe et al. ............. 359/80 |
| 5,317,434 A | * | 5/1994 | Ohara .......................... 359/58 |
| 5,396,355 A | * | 3/1995 | Wada et al. .................. 359/73 |
| 5,625,473 A | * | 4/1997 | Kondo et al. ................. 349/86 |
| 5,717,474 A | * | 2/1998 | Sarma .......................... 349/85 |
| 5,818,625 A | * | 10/1998 | Forgette et al. ............. 359/267 |
| 5,959,713 A | * | 9/1999 | Kobayashi .................. 349/192 |
| 6,052,170 A | * | 4/2000 | Kobayashi .................. 349/149 |
| 6,144,431 A | * | 11/2000 | Yamahara et al. .......... 349/117 |
| 6,151,091 A | * | 11/2000 | Muramatsu ................. 349/149 |
| 6,172,727 B1 | * | 1/2001 | Ozaki et al. ................ 349/128 |
| 6,226,067 B1 | * | 5/2001 | Nishiguchi et al. ......... 349/155 |
| 6,327,012 B1 | * | 12/2001 | Isohata ....................... 349/123 |
| 6,335,773 B1 | * | 1/2002 | Kamei et al. ................. 349/96 |

(Continued)

FOREIGN PATENT DOCUMENTS

EP        0 466 112 A2  *  1/1992

(Continued)

OTHER PUBLICATIONS

Republic of China First Office Action, China Application No. 99801452.4.

(Continued)

*Primary Examiner*—Dung T. Nguyen
*Assistant Examiner*—Mike Qi
(74) *Attorney, Agent, or Firm*—Harness, Dickey & Pierce, P.L.C.

(57) ABSTRACT

In a liquid crystal panel 1 provided with first and second substrates 1 and 3 bonded by a sealant 3, alignment layers 13 and 23 for covering electrodes 6A and 7A, respectively, are formed up to the regions overlapping the regions for forming up to 3. Accordingly, since there is no space between the alignment 13 or 23 and the sealant 3, a low twist domain does not occur in a liquid crystal 40. Therefore, the vicinity of the inner periphery of the sealant can also be effectively used as the region for displaying images.

25 Claims, 12 Drawing Sheets

U.S. PATENT DOCUMENTS

| | | | |
|---|---|---|---|
| 6,400,438 B1 * | 6/2002 | Noritake et al. | 349/149 |
| 6,459,467 B1 * | 10/2002 | Hashimoto et al. | 349/153 |
| 6,507,381 B1 * | 1/2003 | Katsuya et al. | 349/130 |
| 6,515,729 B1 * | 2/2003 | Hoshino | 349/158 |
| 2002/0001056 A1 * | 1/2002 | Sandberg et al | 349/123 |

FOREIGN PATENT DOCUMENTS

| | | | |
|---|---|---|---|
| JP | 52-038948 | | 3/1977 |
| JP | 59-174820 | * | 10/1984 |
| JP | 60-181730 | * | 9/1985 |
| JP | 60-181731 | | 9/1985 |
| JP | 62-269119 | * | 11/1987 |
| JP | 62-269934 | | 11/1987 |
| JP | 04-070811 | | 3/1992 |
| JP | 04-77131 | | 6/1992 |
| JP | 04-77131 | | 7/1992 |
| JP | 06-208124 | | 7/1994 |
| JP | 08-278489 | | 10/1996 |
| JP | 10-198285 | | 7/1998 |
| KR | 1994-0015614 | | 7/1994 |

OTHER PUBLICATIONS

Correspondence from Japanese Patent Office regarding counterpart application.

Japanese Search Report for 2000-567986.

Communication from Japanese Patent Office re: counterpart application.

Communication from Korean Patent Office re: counterpart application.

Japanese Search Report for 2000-567986.

* cited by examiner

Regions for forming alignment layers 13 and 23 and transparent insulation films 12 and 22

LIQUID CRYSTAL PANEL AND METHOD OF FABRICATING THE SAME

TECHNICAL FIELD

The present invention relates to liquid crystal panels used for liquid crystal display devices and methods of fabricating the same. More particularly, the invention relates to fabricating techniques for the individual substrates constituting the liquid crystal panels.

BACKGROUND ART

As shown in FIGS. 11(A) and 11(B), a first substrate 1 and a second substrate 2 constituting a liquid crystal panel 10 are bonded to each other by a sealant 3 with spacers 32 therebetween, leaving a predetermined gap. A liquid crystal 40 is enclosed in a gap 31. Polarizers 4A and 4B are attached to the first and second substrates 1 and 2, respectively. On the inner surface of the first substrate 1, electrodes 6A, which are composed of ITO (Indium Tin Oxide) films as transparent conductive films or the like for displaying various characters or for displaying dots, are formed on the surface of an underlayer protective film 11, which is composed of a silicon oxide film or the like; and on the inner surface of the second substrate 2, electrodes 7A composed of ITO films for displaying various characters or for displaying dots are also formed on the surface of an underlayer protective film 21 composed of a silicon oxide film or the like. Transparent insulation films 12 and 22 are formed so as to cover the electrodes 6A and 7A in the first and second substrates 1 and 2, and alignment layers 13 and 23 composed of polyimide films are formed on the surfaces of the transparent insulation films 12 and 22.

The sealant 3 conventionally used is composed of a two-part phenol-novolac-type epoxy resin or two-part aliphatic-type epoxy resin, and if the sealant 3 is brought into contact with the alignment layers 13 and 23 composed of polyimide films, sufficient adhesion does not tend to be obtainable at the interfaces. Therefore, in the conventional liquid crystal panel 10, a space S must be secured between the sealant 3 and the alignment layer 13 and between the sealant 3 and the alignment layer 23, and the following fabrication method has been used. That is, in the fabrication process of the conventional liquid crystal panel 10, as shown in FIG. 12, firstly, electrodes 6A and 7A are formed in the regions for forming the individual substrates, which correspond to single first and second substrates 1 and 2, produced by dividing first and second large substrates 1A and 2A which include a plurality of first and second substrates 1 and 2 to be cut out, and which are obtained by cutting along cutting projection lines L1 and L2 of the large substrates 1A and 2A. The transparent insulation films 12 and 22 are then formed in the regions (the regions marked by slanted broken lines in FIG. 12) that are slightly inside the regions for forming the sealant 3. Next, the alignment layers 13 and 23 (polyimide films) are formed by flexographic printing so as to be superposed on the transparent insulation films 12 and 22. On one of the first and second large substrates 1A and 2A, the sealant 3 is formed so as to surround the regions for forming alignment layers 13 and 23 in the periphery, and the first and second large substrates 1A and 2A are bonded to each other with the sealant 3. Next, after the bonded first and second large substrates 1A and 2A are separated into single panels or into strip panels, a liquid crystal is injected under reduced pressure from an opening 30 of the sealant 3, and the opening 30 of the sealant 3 is then closed.

However, in the conventional liquid crystal panel 10, as shown in FIG. 11(B), since there is the space S between the sealant 3 and the alignment layer 13 or 23, a low twist domain occurs in the liquid crystal 40 in the section corresponding to the space S. Since the low twist domain degrades the display quality, such a region cannot be used as the region for displaying images. Consequently, the effective region for displaying images is reduced. If the alignment layers 13 and 23 are formed by flexographic printing so as to be brought as close as possible to the region for forming the sealant 3 (the region marked by slanted solid lines), the region in which the low twist domain occurs can be reduced. However, even if the accuracy of a flexographic printer is increased, it is not possible to control the printing region (the region marked by slanted broken lines in FIG. 12) of the alignment layers 13 and 23 in a roller travelling direction (the direction shown by an arrow X in FIG. 12) so as to reduce the space S in which the low twist domain occurs. Although, in the width direction of a roller used for flexographic printing (the direction shown by an arrow Y in FIG. 12), the printing region can be easily controlled in comparison with that in the roller travelling direction, yet it is impossible to narrow the region in which the low twist domain occurs beyond a certain amount.

In view of the problems described above, it is an object of the present invention to provide a liquid crystal panel in which the region for displaying images can be enlarged by preventing the low twist domain occurring in the space region between alignment layers and a sealant.

DISCLOSURE OF INVENTION

In order to overcome the problems described above, in accordance with the present invention, a liquid crystal panel includes a pair of rectangular substrates bonded to each other by a sealant with a predetermined gap therebetween, a liquid crystal enclosed in the region delimited by the sealant between the pair of substrates, and electrodes formed on each of the pair of substrates for controlling the alignment state of the liquid crystal. Each of the pair of substrates is provided with an alignment layer formed on the electrode-side surface, the alignment layer being formed up to the region overlapping the region for forming the sealant in the sections corresponding to at least three sides of the substrate provided with the alignment layer.

In accordance with the present invention, since the alignment layer is formed up to the region overlapping the region for forming the sealant, there is no space between the sealant and the alignment layer. Therefore, a low twist domain does not occur in the vicinity of the inner periphery of the sealant. Thus, since the vicinity of the inner periphery of the sealant can be used effectively, the region for displaying images can be enlarged.

In the liquid crystal panel in the present invention, the sealant may be a one-part thermosetting epoxy sealant having good adhesion to a polyimide film used as an alignment layer.

In accordance with the present invention, since the one-part thermosetting epoxy sealant has good adhesion to the polyimide film used as the alignment layer, and in particular, since a one-part thermosetting epoxy sealant mixed with a high-impact epoxy, in which an acrylic rubber or silicone rubber is polymerized by graft polymerization to an epoxy resin, has excellent adhesion to the polyimide film, even if the sealant is formed so as to overlap the surface of the alignment layer, satisfactory water-tightness and airtightness can be secured at the interface.

In the liquid crystal panel in the present invention, the alignment layer may be formed up to the region overlapping the region for forming the sealant in the sections corresponding to four sides of the substrate.

In the liquid crystal panel in the present invention, the alignment layer may be formed up to the edges of the substrate across the region for forming the sealant in the individual sides of the substrate excluding the side provided with input-output terminals and terminals for conducting between substrates.

In the liquid crystal panel in the present invention, a transparent insulation film for covering the electrodes on the lower layer side of the alignment layer may be formed in the region substantially overlapping the region for forming the alignment layer.

A method of fabricating the liquid crystal panel in accordance with the present invention includes the step of forming the electrodes on the surface of a large substrate for forming a plurality of pairs of substrates in the individual regions for forming the substrates which correspond to the pair of substrates obtained by cutting the large substrate along cutting projection lines, and the step of forming thin films for forming the alignment layers up to the regions for overlapping the regions for forming the sealant at least in the sections corresponding to three sides of the regions for forming the corresponding substrates.

The method of fabricating the liquid crystal panel in accordance with the present invention may include the step of forming the electrodes on the surface of a large substrate for forming a plurality of pairs of substrates in the individual regions for forming the substrates which correspond to the pair of substrates obtained by cutting the large substrate along cutting projection lines, and the step of forming thin films for forming the alignment layers, respectively, on a plurality of substrate forming-regions including the cutting projection lines.

The method of fabricating the liquid crystal panel in accordance with the present invention may include the step of forming the electrodes on the surfaces of a pair of large substrates for forming a plurality of pairs of substrates in the regions for forming the individual substrates which correspond to the pair of substrates obtained by cutting the large substrates along cutting projection lines, the step of forming thin films for forming the alignment layers on the plurality of substrate forming-regions including the cutting projection lines in each of the pair of large substrates, the step of forming the sealant on at least one of the pair of large substrates to bond the large substrates to each other, and the step of cutting the bonded large substrates along the cutting projection lines.

In the method of fabricating the liquid crystal panel in accordance with the present invention, in the large substrate, the substrate forming-regions may be placed with a cutting projection line therebetween so that the sides provided with input-output terminals and terminals for conducting between substrates are directed in the opposite directions, and when the thin films for forming the alignment layers are formed, the thin films are formed in strip along the cutting projection line. If the thin films for forming the alignment layers are formed in strip, in flexographic printing, the end of a roller is directed to the side provided with input-output terminals and terminals for conducting between substrates. In such a width direction of the roller, differing from that in the travelling direction of the roller, the printing regions can be controlled with high accuracy to a certain extent, and in the width direction, even when the alignment layer cannot be formed up to the edge of the substrate, the alignment layer can be formed so as to be substantially adjacent to the region for forming the sealant, or to overlap the region for forming the sealant.

BEST MODE FOR CARRYING OUT THE INVENTION

Embodiments of the present invention will be described below with reference to the accompanying drawings.

First Embodiment (General Structure)

Figure 1:
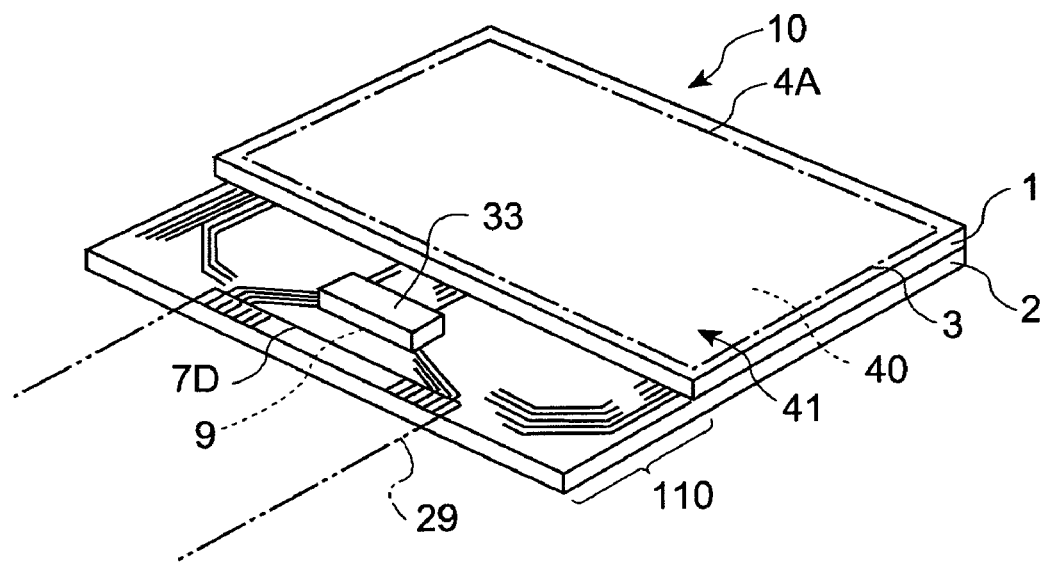
FIG. 1 is a perspective view of a liquid crystal display device.
Figure 2:
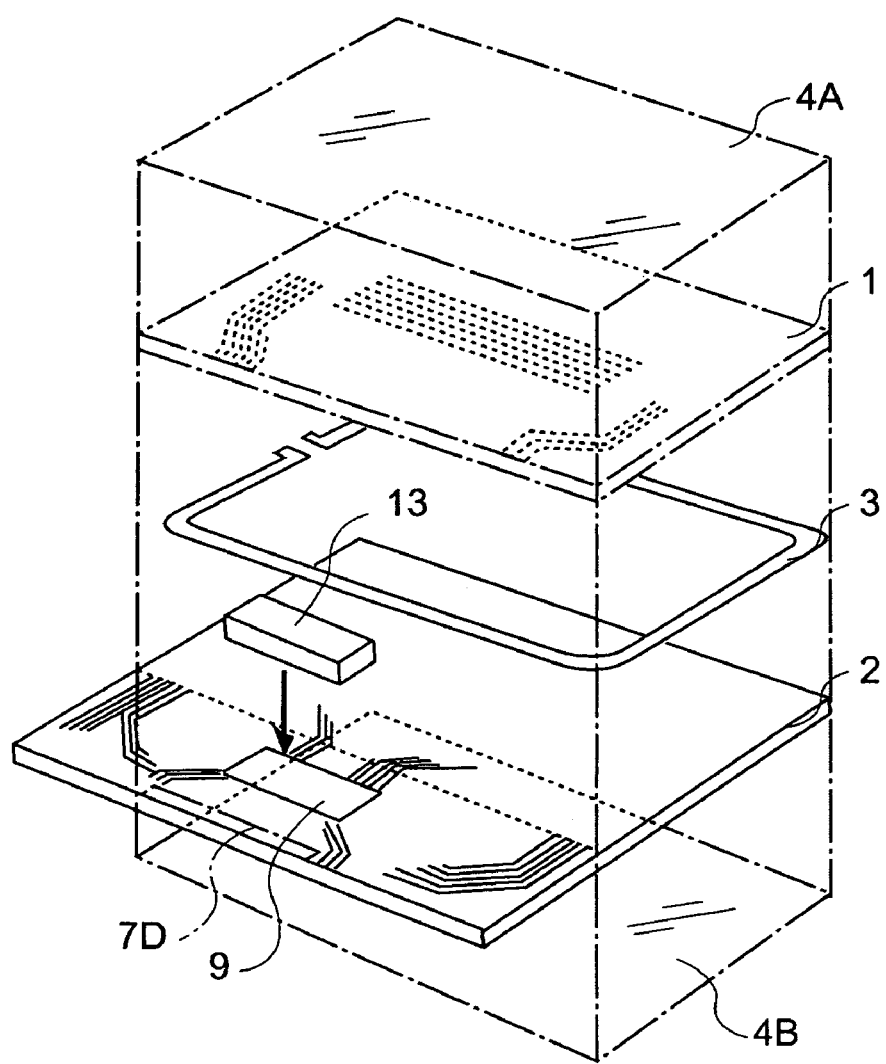
FIG. 2 is an exploded perspective view of a liquid crystal panel used in the liquid crystal display device shown in FIG. 1.
Figure 3:
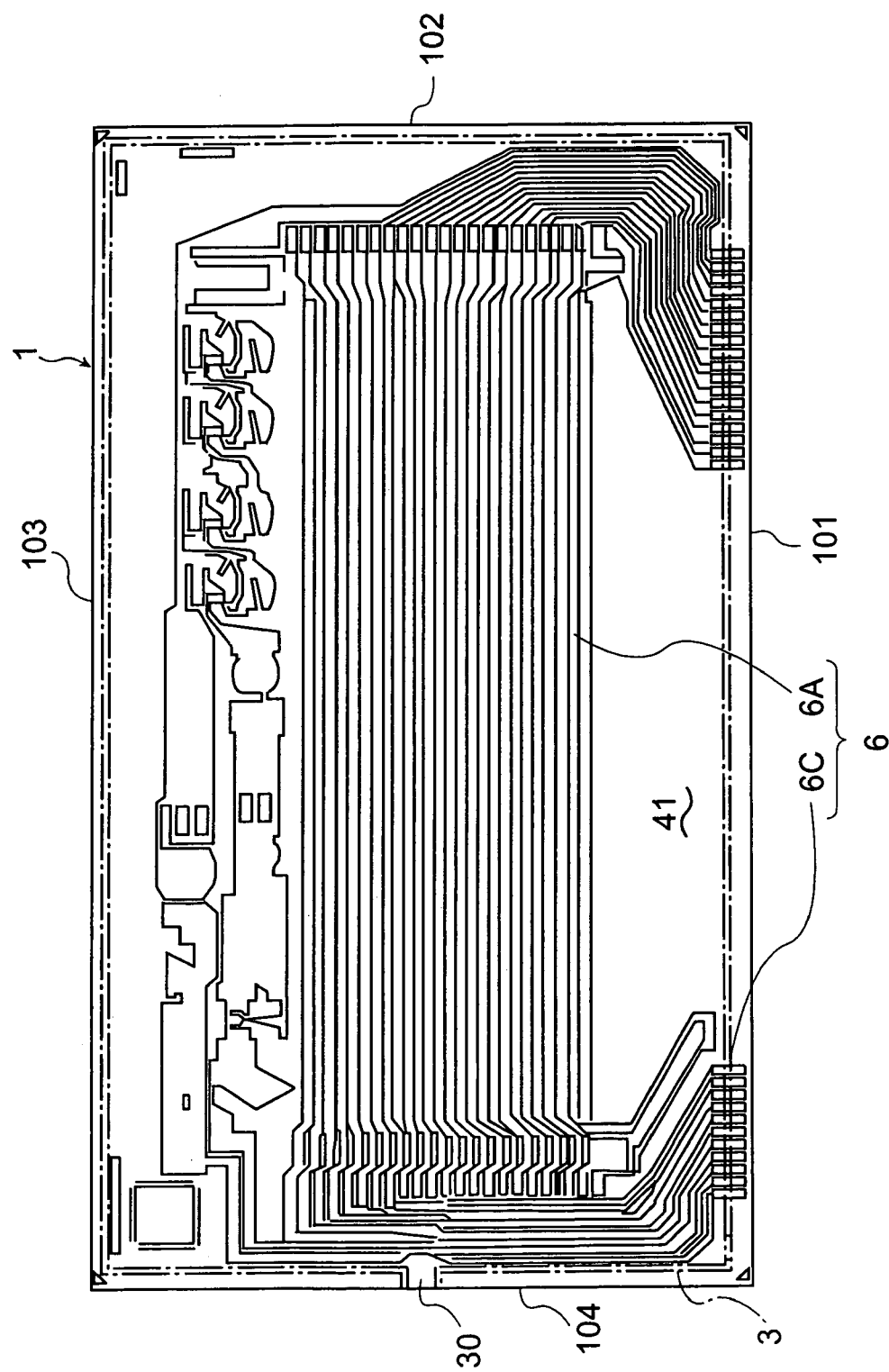
FIG. 3 is a plan view which shows the configuration pattern of transparent electrodes formed on a first substrate of the liquid crystal panel shown in FIG. 1.
Figure 4:
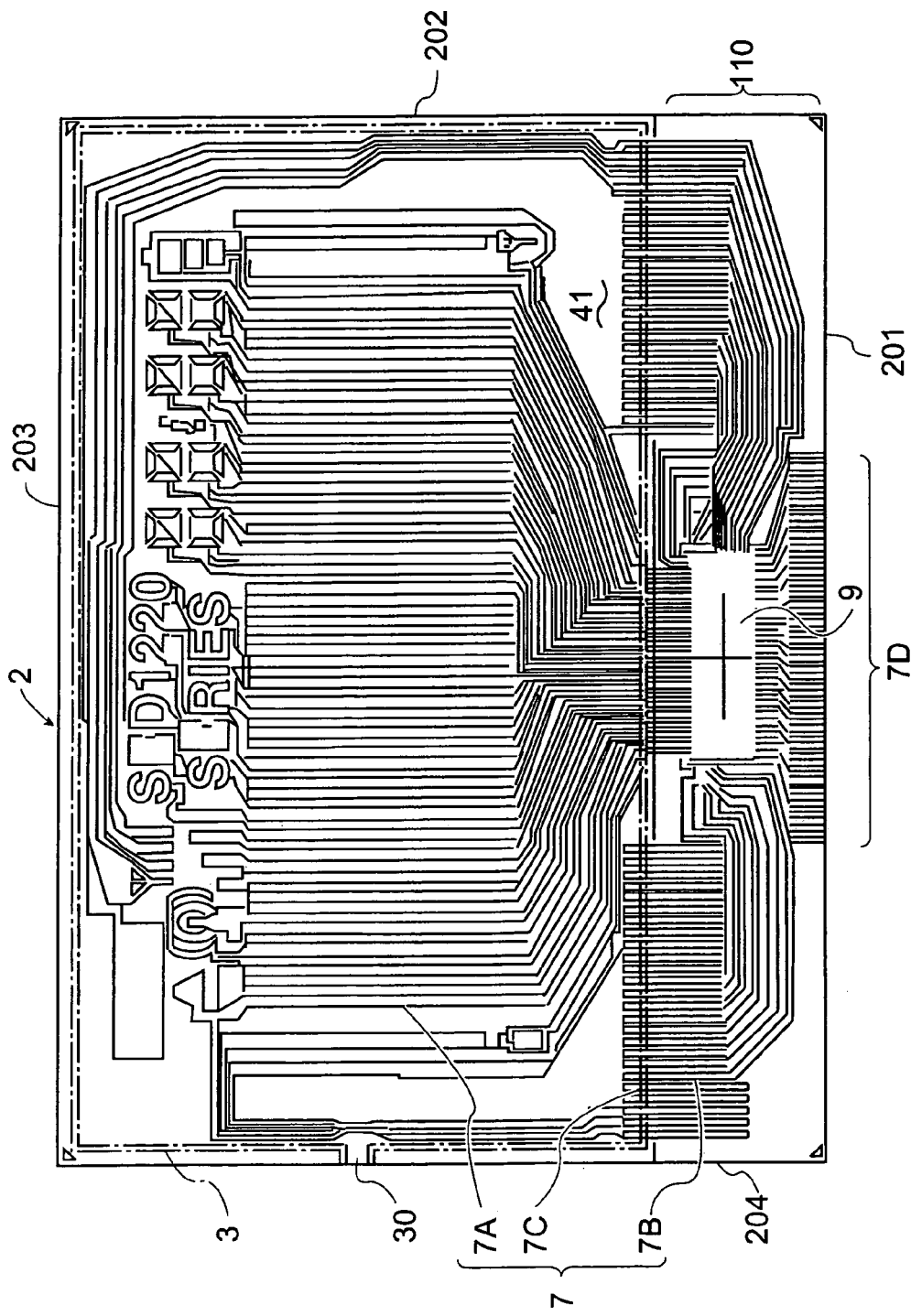
FIG. 4 is a plan view which shows the configuration pattern of transparent electrodes formed on a second substrate of the liquid crystal panel shown in FIG. 1.

FIG. 1 is a perspective view of a liquid crystal display device and FIG. 2 is an exploded perspective view thereof. In FIGS. 1 and 2, only portions of wiring patterns and terminals are shown, and the details thereof are shown in FIGS. 3 and 4.

In FIGS. 1 and 2, a liquid crystal panel 10 of a liquid crystal display device mounted on an electronic apparatus such as a cordless telephone includes a first substrate 1 composed of transparent glass or the like and a second substrate 2 also composed of transparent glass or the like. A sealant 3 containing gap fillers and conductive particles is formed on one of the substrates by printing or the like, and the first substrate 1 and the second substrate 2 are bonded to each other with the sealant 3 therebetween. In this state, a predetermined gap is maintained between the first substrate 1 and the second substrate 2 by the gap fillers contained in the sealant 3, and a liquid crystal 40 is enclosed in the gap in a liquid crystal filling-region 41 which is delimited by the sealant 3. A polarizer 4A is attached to the outer surface of the first substrate 1 by an adhesive or the like, and a polarizer 4B is attached to the outer surface of the second substrate 2 by an adhesive or the like. When the liquid crystal panel 10 is fabricated as a reflection type, a reflector (not shown in the drawing) is attached to the exterior of the polarizer 4B attached to the second substrate 2 or is attached instead of the polarizer 4B.

In this embodiment, since the second substrate 2 is larger than the first substrate 1, when the first substrate 1 is overlaid on the second substrate 2, a portion of the second substrate 2 protrudes from the lower edge of the first substrate 1. In a protruding section 110, an IC mounting region 9 is formed, and a driver IC 33 is mounted thereon by a COG (Chip On Glass) method.

In the second substrate 2, a plurality of input-output terminals 7D are formed along the edge of the substrate so as to adjoin the IC mounting region 9 on the lower edge side of the IC mounting region 9. A flexible substrate 29 is connected to the input-output terminals 7D, as shown by two-dot chain lines in FIG. 1.

FIGS. 3 and 4 are plan views which show the configuration patterns of transparent electrodes formed on the first substrate 1 and the second substrate 2, respectively.

In FIG. 3, an electrode pattern 6, which is provided with electrodes 6A for displaying characters or for displaying dots and terminals 6C for conducting between substrates lying along a side 101 in order to obtain conduction to the second substrate 2 in the exterior to the liquid crystal filling-region 41, is formed on the inner surface of the first substrate 1. The electrode pattern 6 is composed of an ITO film or the like.

In FIG. 4, an electrode pattern 7, which is provided with electrodes 7A for displaying characters or for displaying dots and a wiring section 7B for wiring the electrodes 7A toward the IC mounting region 9 in the exterior of the liquid crystal filling-region 41, and terminals 7C for conducting between substrates lying along a side 201 in order to obtain conduction to the first substrate 1 in the exterior of the liquid crystal filling-region 41, is formed. The electrode pattern 7 is also composed of an ITO film or the like.

When the first substrate 1 and the second substrate 2 having the structures as described above are bonded to each other as shown in FIG. 1 and FIGS. 5(A) and 5(B), since the terminals 6C of the first substrate 1 and the terminals 7C of the second substrate 2 are opposed to each other, the conductive particles contained in the sealant 3 interposed between the terminals 6C and 7C electrically connect the terminals 6C and 7C, and thus conduction between the first substrate 1 and the second substrate 2 is enabled. That is, the conductive particles contained in the sealant 3 are composed of elastically deformable plastic beads which are subjected to nickel plating or gold plating, and have particle sizes of approximately 5 to 9 µm. In contrast, the gap fillers contained in the sealant 3 have particle sizes of approximately 4 to 8 µm. Therefore, when the sealant 3 is melted and cured while the first substrate 1 is superposed on the second substrate 2 and pressure is applied so as to narrow the gap, the conductive particles, in a squeezed state between the first substrate 1 and the second substrate 2, electrically connect the terminals 6C of the first substrate 1 to the terminal 7C of the second substrate 2.

Since electrodes 6A of the first substrate 1 and the electrodes 7A of the second substrate 2 are opposed to each other when the first substrate 1 and the second substrate 2 are bonded to each other, by applying an electric field to the liquid crystal 40 with the electrodes 6A and 7A, the alignment state of the liquid crystal 40 can be controlled, and desired images can be displayed on the liquid crystal panel 10.

(Structures of Transparent Insulation Films and Alignment Layers)

Figure 5A:
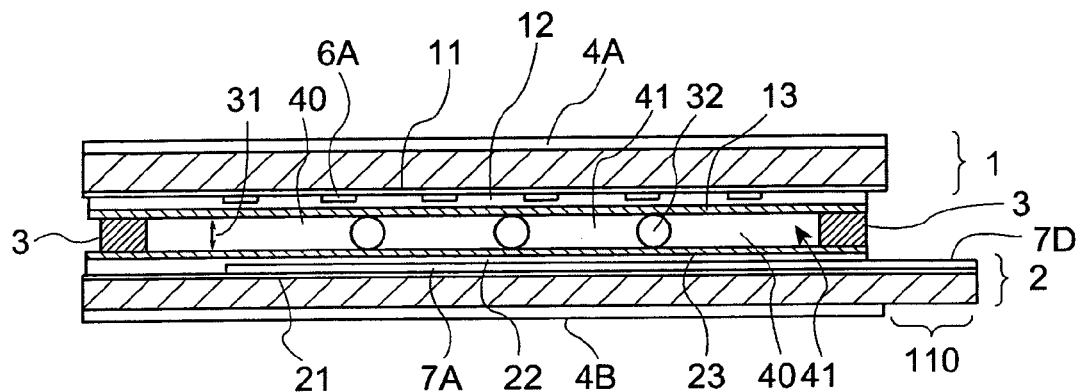
FIGS. 5(A) and 5(B) are a sectional view of the liquid crystal panel shown in FIG. 1 and an enlarged sectional view of the end thereof, respectively.
Figure 5B:
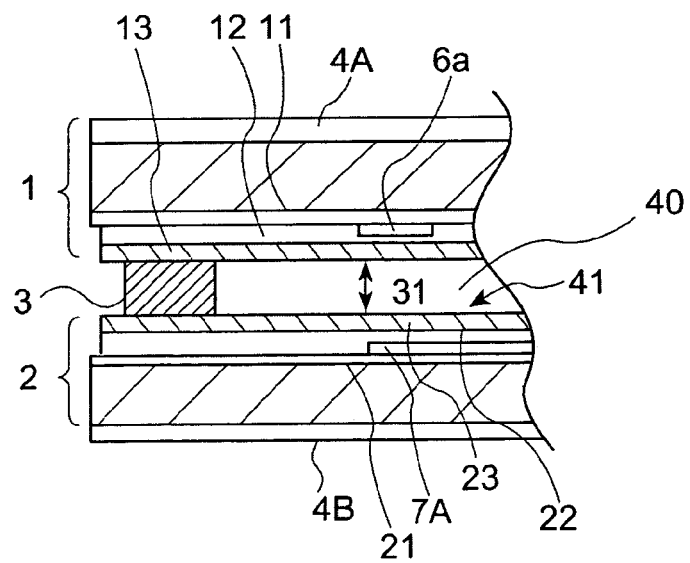
Figure 6:
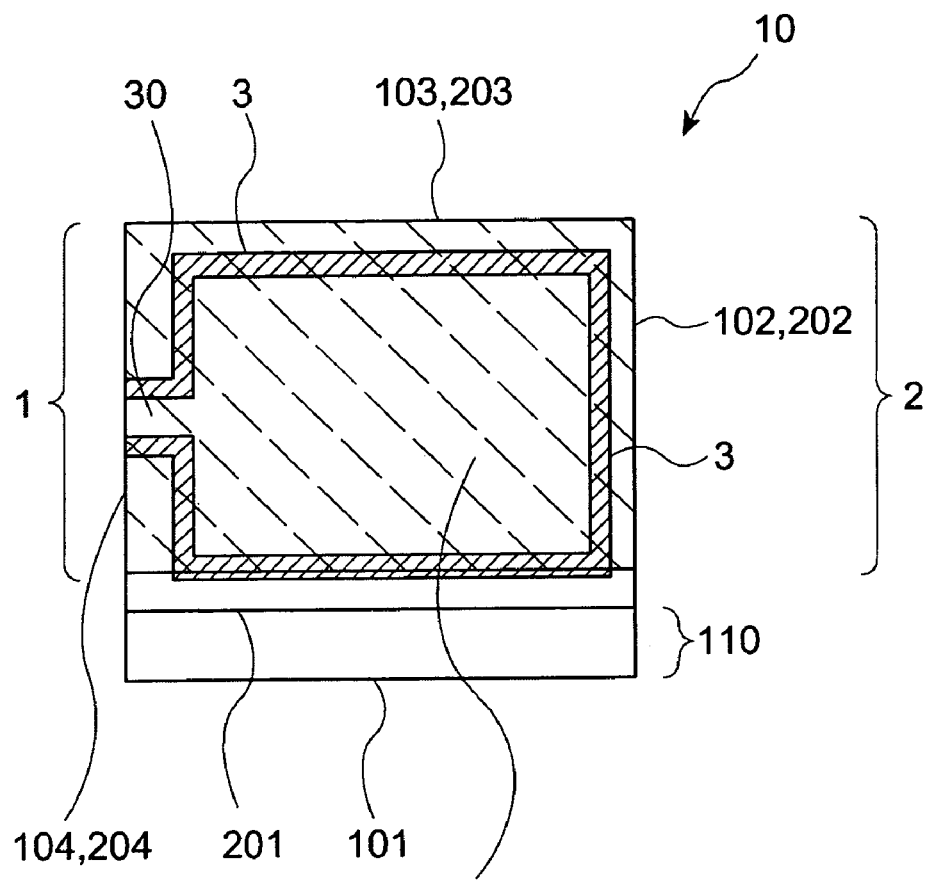
FIG. 6 is a plan view of the liquid crystal panel shown in FIG. 1, schematically showing the relationship between the regions for forming alignment layers and the regions for forming a sealant.

FIGS. 5(A) and 5(B) are a sectional view of the liquid crystal panel shown in FIG. 1 and an enlarged sectional view of the end thereof, respectively. FIG. 6 is a plan view of the liquid crystal panel shown in FIG. 1, schematically showing the relationship between the regions for forming alignment layers and the regions for forming the sealant.

In the liquid crystal panel 10 having such a structure, as shown in FIGS. 5(A) and 5(B), in the first substrate 1 and the second substrate 2, transparent insulation films 12 and 22 are formed so as to cover the electrodes 6A and 7A, and on the surface of the transparent insulation films 12 and 22, alignment layers 13 and 23 composed of polyimide films are formed. The alignment layers 13 and 23 are the polyimide films which are subjected to rubbing treatment, and the liquid crystal 40 is used in STN (Super Twisted Nematic) mode.

As shown in FIGS. 5(A) and 5(B) and FIG. 6 (the regions for forming alignment layers 13 and 23 and transparent insulation films 12 and 22 are shown by slanted broken lines, and the regions for forming the sealant 3 are shown by slanted solid lines), in both the first substrate 1 and the second substrate 2, the transparent insulation films 12 and 22 and the alignment layers 13 and 23 are formed up to the region overlapping the region for forming the sealant 3 in the sections corresponding to four sides 101 to 104 and 201 to 204 of the first and second substrates 1 and 2, respectively.

As the sealant 3, in this embodiment, a one-part thermosetting epoxy sealant, which has good adhesion even to polyimide films constituting the alignment layers 13 and 23, is used. For example, Structbond ES series (trade name) manufactured by Mitsui Toatsu Kagaku K. K. is used. In the one-part thermosetting epoxy sealant, a latent curing agent, such as dicyandiamide, a dihydrazide, or an imidazole, is dispersed in an epoxy resin, and an inorganic filler, a solvent, a viscosity modifier, etc. are further mixed thereto. To this system, a high-impact epoxy in which an acrylic or silicone rubber is polymerized by graft polymerization to an epoxy resin (technique for producing high impact epoxy) is mixed. Therefore, among one-part thermosetting epoxy sealants, since the Structbond ES series manufactured by Mitsui Toatsu Kagaku K. K. has excellent adhesion even to polyimide films, even if the sealant 3 is formed so as to overlap the surface of the alignment layers 13 and 23, excellent water-tightness and airtightness are demonstrated at the interfaces.

When the regions for forming the alignment layers 13 and 23 are defined, since terminals 6C for conducting to the second substrate 2 are formed in the section corresponding to the side 101 of the first substrate 1, and terminals 7C for conducting to the first substrate 1 and the input-output terminals 7D are formed in the section corresponding to the side 201 of the second substrate 2, if the terminals 6C, 7C, and 7D are covered with the alignment layers 13 and 23, electrical continuity cannot be obtained. Thus, in this embodiment, with respect to the four sides 101 to 104 and 201 to 204 of the first and second substrates 1 and 2, in the sections corresponding to the sides 101 and 201 in which the terminals 6C and 7C for conduction and the input-output terminals 7D are formed, the alignment layers 13 and 23 are formed so as to partially overlap the regions for forming the sealant 3, and in the sections corresponding to the other three sides 102 to 104 and 202 to 204, the alignment layers 13 and 23 are formed up to the edges of the first and second substrates 1 and 2.

The transparent insulation films 12 and 22, which are formed so as to cover the electrodes 6C and 7C, are formed so as to substantially overlap the alignment layers 13 and 23. That is, with respect to the transparent insulation films 12 and 22, if the terminals 6C and 7C for conduction and the input-output terminals 7D of the first and second substrates 1 and 2 are covered, electrical continuity cannot be obtained. Thus, with respect to the four sides 101 to 104 and 201 to 204 of the first and second substrates 1 and 2, in the sections corresponding to the sides 101 and 201 in which the terminals 6C and 7C for conduction and the input-output terminals 7D are formed, the transparent insulation films 12 and 22 are formed so as to partially overlap the regions for forming the sealant 3, and in the sections corresponding to the other three sides 102 to 104 and 202 to 204, the transparent insulation films 12 and 22 are formed up to the edges of the first and second substrates 1 and 2.

Therefore, in the liquid crystal panel 10 in this embodiment, as shown in FIG. 5(B), since there is no space between the sealant 3 and the alignment layers 13 and 23, a low twist domain does not occur in the liquid crystal 40 in the vicinity of the inner periphery of the sealant 3. Consequently, since the vicinity of the inner periphery of the sealant 3 can be also used as the effective region for displaying images, the region for displaying images can be enlarged.

(Method of Fabricating Liquid Crystal Panel)

Figure 7:
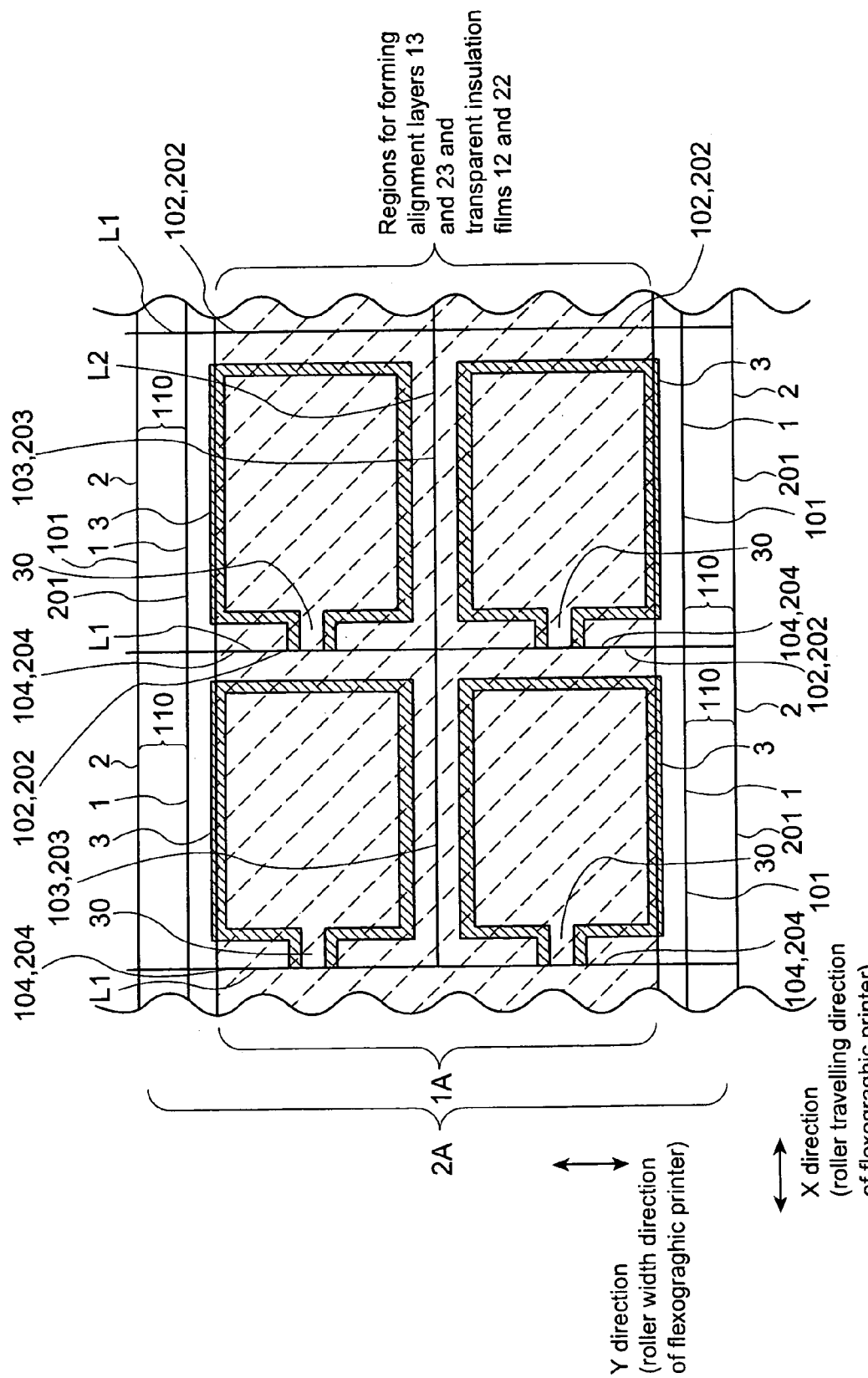
FIG. 7 is a schematic diagram which shows first and second large substrates for forming a plurality of first and second substrates, respectively, regions for forming transparent insulation films and alignment layers (regions marked by broken lines slanting to the left) formed on the first and second large substrates, and regions for forming the sealant (regions marked by solid lines slanting to the right) in the fabrication process of the liquid crystal panel shown in FIG. 1.

A method of fabricating the liquid crystal panel 10 having such a structure will be described with reference to FIGS. 5(A), 5(B), and 7. FIG. 7 is a schematic diagram which shows the first and second large substrates 1A and 2A for forming a plurality of first and second substrates 1 and 2, respectively, regions for forming the transparent insulation films 12 and 22 and the alignment layers 13 and 23 formed on the first and second large substrates 1A and 2A, and regions for forming the sealant 3 in the fabrication process of the liquid crystal panel shown in FIG. 1. In FIG. 7, since the first and second large substrates 1A and 2A for forming a plurality of first and second substrates 1 and 2, respectively, regions for forming the transparent insulation films 12 and 22 and the alignment layers 13 and 23 (regions marked by slanted broken lines) in relation to the first and second large substrates 1A and 2A, and regions for forming the sealant 3 (regions marked by slanted solid lines) are shown and other components are omitted, the individual components to be formed on the first and second large substrates 1A and 2A will be described with reference to FIGS. 5(A) and 5(B).

First, as shown in FIGS. 5(A) and 5(B) and FIG. 7, after underlayer protective films 11 and 21 are formed over the surfaces of the first and second large substrates 1A and 2A for forming a plurality of first and second substrates 1 and 2, respectively, electrode patterns 6 and 7 including the electrodes 6A and 7A and the terminals 6C and 7C are formed by photolithography in the individual substrate forming-regions, which are to be separated into the first and second substrates 1 and 2 by cutting the large substrates 1A and 2A along the cutting projection lines L1 and L2.

Next, with respect to the first and second large substrates 1A and 2A, transparent insulation films 12 and 22 composed of silicon oxide films are formed so as to cover the electrodes 6A and 7A. The transparent insulation films 12 and 22 are formed in strip covering a plurality of substrate forming-regions including the cutting projection lines L1 and L2. That is, in the first and second large substrates 1A and 2A, the substrate forming-regions are disposed with the cutting projection line L2 therebetween so that the sides 101 and 201, in which the input-output terminals 7D and the terminals 6C and 7C for conducting between substrates are formed, are directed in the opposite directions, the transparent insulation films 12 and 22 are formed in strip along the cutting projection line L2. As a result, when the first and second large substrates 1A and 2A are divided into single first and second substrates 1 and 2 by cutting along the cutting projection lines L1 and L2, in the sections corresponding to the four sides 101 to 104 and 201 to 204 of the first and second substrates 1 and 2, the transparent insulation films 12 and 22 are formed so as to be superposed on the regions for forming the sealant 3. In the sections corresponding to three sides 102 to 104 and 202 to 204, excluding the sides 101 and 201 in which the terminals 6A and 7A for conducting between substrates and the input-output terminals 7D are formed, among the four sides 101 to 104 and 201 to 204 of the first and second substrates 1 and 2, the transparent insulation films 12 and 22 are formed up to the edges of the first and second substrates 1 and 2 across the regions for forming the sealant 3, and in the sections corresponding to the sides 101 and 201 in which the terminals 6A and 7A for conducting between substrates and the input-output terminals 7D are formed, the transparent insulation films 12 and 22 are formed so as to partially overlap the regions for forming the sealant 3.

Next, polyimide films (alignment layers 13 and 23) are formed by flexographic printing so as to cover the transparent insulation films 12 and 22 in the first and second large substrates 1A and 2A. The polyimide films (alignment layers 13 and 23) are also formed in strip over the plurality of substrate forming-regions including the cutting projection lines L1 and L2. That is, in the first and second large substrates 1A and 2A, since the substrate forming-regions are disposed with the cutting projection line L2 therebetween so that the sides 101 and 201, in which the input-output terminals 7D and terminals 6C and 7C for conducting between substrates are formed, are directed in the opposite directions, the polyimide films (alignment layers 13 and 23) are formed in strip along the cutting projection line L2 by moving a roller in a flexographic printer along the cutting projection line L2 with the end of the roller being directed toward the sides 101 and 201. As a result, when the first and second large substrates 1A and 2A are divided into single first and second substrates 1 and 2 by cutting along the cutting projection lines L1 and L2, in the sections corresponding to the four sides 101 to 104 and 201 to 204 of the first and second substrates 1 and 2, the polyimide films (alignment layers 13 and 23) are formed so as to be superposed on the regions for forming the sealant 3. In the sections corresponding to three sides 102 to 104 and 202 to 204, excluding the sides 101 and 201 in which the terminals 6A and 7A for conducting between substrates and the input-output terminals 7D are formed, among the four sides 101 to 104 and 201 to 204 of the first and second substrates 1 and 2, the polyimide films (alignment layers 13 and 23) are formed up to the edges of the first and second substrates 1 and 2 across the regions for forming the sealant 3 and in the sections corresponding to the sides 101 and 201 in which the terminals 6A and 7A for conducting between substrates and the input-output terminals 7D are formed, the polyimide films (alignment layers 13 and 23) are formed so as to partially overlap the regions for forming the sealant 3.

Next, rubbing treatment is performed on the first and second large substrates to form the alignment layers 13 and 23 from the polyimide films.

Next, with respect to the second large substrate 2A, after the sealant 3 is printed on the surfaces of the alignment layers 13 and 23, pre-baking is performed, and then the first large substrate 1A and the second large substrate 2A are bonded to each other with the sealant 3 therebetween. At this stage, as shown in FIG. 5(A), after spacers 32 are scattered on the first large substrate 1A, the first large substrate 1A and the second large substrate 2A are bonded to each other.

Again, in FIGS. 5(A) and 5(B) and FIG. 7, after the first large substrate 1A and the second large substrate 2A are bonded to each other, the bonded first large substrate 1A and second large substrate 2A are divided into single liquid crystal panels 10 by cutting along the cutting projection lines L1 and L2, or the bonded first large substrate 1A and second large substrate 2A are divided into strip panels by cutting along the cutting projection line L1. In either state of cutting, openings 30 of the sealant 3 are opened in the cut surfaces (corresponding to the sides 104 and 204).

Consequently, when the regions delimited by the sealant 3 in the gap between the first and second substrates 1 and 2 are evacuated and the openings 30 are immersed in the liquid crystal, by increasing the pressure of the surrounding atmosphere, the liquid crystal 40 is injected into the regions delimited by the sealant 3. Thus, by closing the openings 30 of the sealant 3 after the liquid crystal 40 is injected, the liquid crystal 40 is enclosed in the gap 31 between the first and second substrates 1 and 2.

At this stage, if the single liquid crystal panels 10 are separated, as shown in FIG. 1 and FIGS. 5(A) and 5(B), the polarizers 4A and 4B, etc. are attached thereto. On the other hand, if the strip panels are separated, after dividing the strip panels into single liquid crystal panels 10, the polarizers 4A and 4B, etc. are attached thereto.

Next, as shown in FIG. 1, the flexible substrate 29 is pressed onto the input-output terminals 7D of the second substrate 2 using an anisotropic conductive film or the like, and is delivered to the inspection step.

As described above, in accordance with the fabrication method in this embodiment, since the polyimide films are applied all over in the roller travelling direction of a flexographic printer (the direction shown by an arrow X in FIG. 7), even if the printing regions for the alignment layers 13 and 23 cannot be controlled in this direction, spaces do not occur between the sealant 3 and the alignment layer 13 or 23. In the roller width direction in flexographic printing (the direction shown by an arrow Y in FIG. 7), although it is necessary to control the printing regions so that the alignment layers 13 and 23 do not cover the terminals 6A and 7A for conducting between substrates and the input-output terminals 7D, in such a direction, it is relatively easy to control the printing regions in the flexographic printer, spaces do not occur between the sealant 3 and the alignment layer 13 or 23 also in this direction.

Second Embodiment

Figure 8:
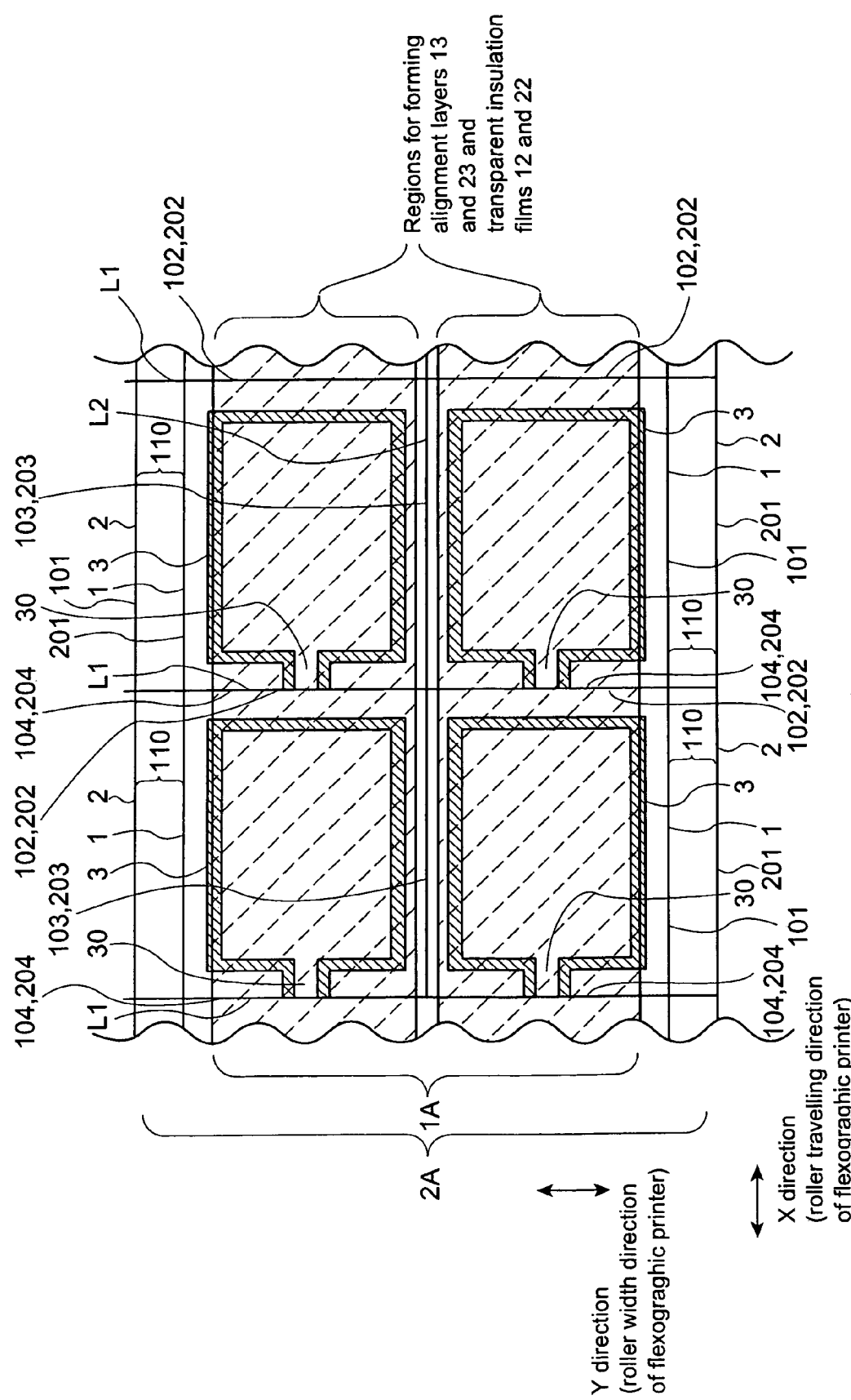
FIG. 8 is a schematic diagram which shows first and second large substrates for forming a plurality of first and second substrates, respectively, regions for forming transparent insulation films and alignment layers (regions marked by broken lines slanting to the left) formed on the first and second large substrates, and regions for forming the sealant (regions marked by solid lines slanting to the right) in the fabrication process of a liquid crystal panel in accordance with a second embodiment of the present invention.

FIG. 8 is a schematic diagram which shows first and second large substrates for forming a plurality of first and second substrates, respectively, regions for forming transparent insulation films and alignment layers (regions marked by broken lines slanting to the left) formed on the first and second large substrates, and regions for forming the sealant (regions marked by solid lines slanting to the right) in the fabrication process of a liquid crystal panel in accordance with a second embodiment of the present invention. Since the basic structure of the liquid crystal panel in this embodiment is in common with that of the liquid crystal panel in accordance with the first embodiment, the same numerals are used for the corresponding sections in FIG. 8, and the detailed description thereof will be omitted.

As shown in FIG. 8, in this embodiment, transparent insulation films 12 and 22 composed of silicon oxide films are formed on first and second large substrates 1A and 2A so as to cover electrodes 6A and 7A (refer to FIGS. 3, 4, 5(A), and 5(B)). Although the transparent insulation films 12 and 22 cover a cutting projection line L1 between cutting projection lines L1 and L2, they do not cover the cutting projection line L2, and the transparent insulation films 12 and 22 are formed in strip by each row, covering a plurality of substrate forming-regions. As a result, when the first and second large substrates 1A and 2A are divided into single first and second substrates 1 and 2 by cutting along the cutting projection lines L1 and L2, in the sections corresponding to the four sides 101 to 104 and 201 to 204 of the first and second substrates 1 and 2, the transparent insulation films 12 and 22 are formed so as to be superposed on the regions for forming the sealant 3. In the sections corresponding to two sides 102 and 104, and 202 and 204, excluding the sides 101 and 201 in which the terminals 6A and 7A for conducting between substrates and the input-output terminals 7D are formed and the sides 103 and 203 lying on the side of the cutting projection line L2, among the four sides 101 to 104 and 201 to 204 of the first and second substrates 1 and 2, the transparent insulation films 12 and 22 are formed up to the edges of the first and second substrates 1 and 2 across the regions for forming the sealant 3.

Next, polyimide films (alignment layers 13 and 23) are formed by flexographic printing so as to cover the transparent insulation films 12 and 22 in the first and second large substrates 1A and 2A. The polyimide films also cover the cutting projection line L1 between the cutting projection lines L1 and L2 and the polyimide films do not cover the cutting projection line L2. The polyimide films are formed in strip by each row over a plurality of substrate forming-regions. As a result, when the first and second large substrates 1A and 2A are divided into single first and second substrates 1 and 2 by cutting along the cutting projection lines L1 and L2, in the sections corresponding to the four sides 101 to 104 and 201 to 204 of the first and second substrates 1 and 2, the polyimide films (alignment layers 13 and 23) are formed so as to be superposed on the regions for forming the sealant 3. In the sections corresponding to two sides 102 and 104, and 202 and 204, excluding the sides 101 and 201 in which the terminals 6A and 7A for conducting between substrates and the input-output terminals 7D are formed and the sides 103 and 203 lying on the side of the cutting projection line L2, among the four sides 101 to 104 and 201 to 204 of the first and second substrates 1 and 2, the polyimide films (alignment layers 13 and 23) are formed up to the edges of the first and second substrates 1 and 2 across the regions for forming the sealant 3.

Third Embodiment

Figure 9:
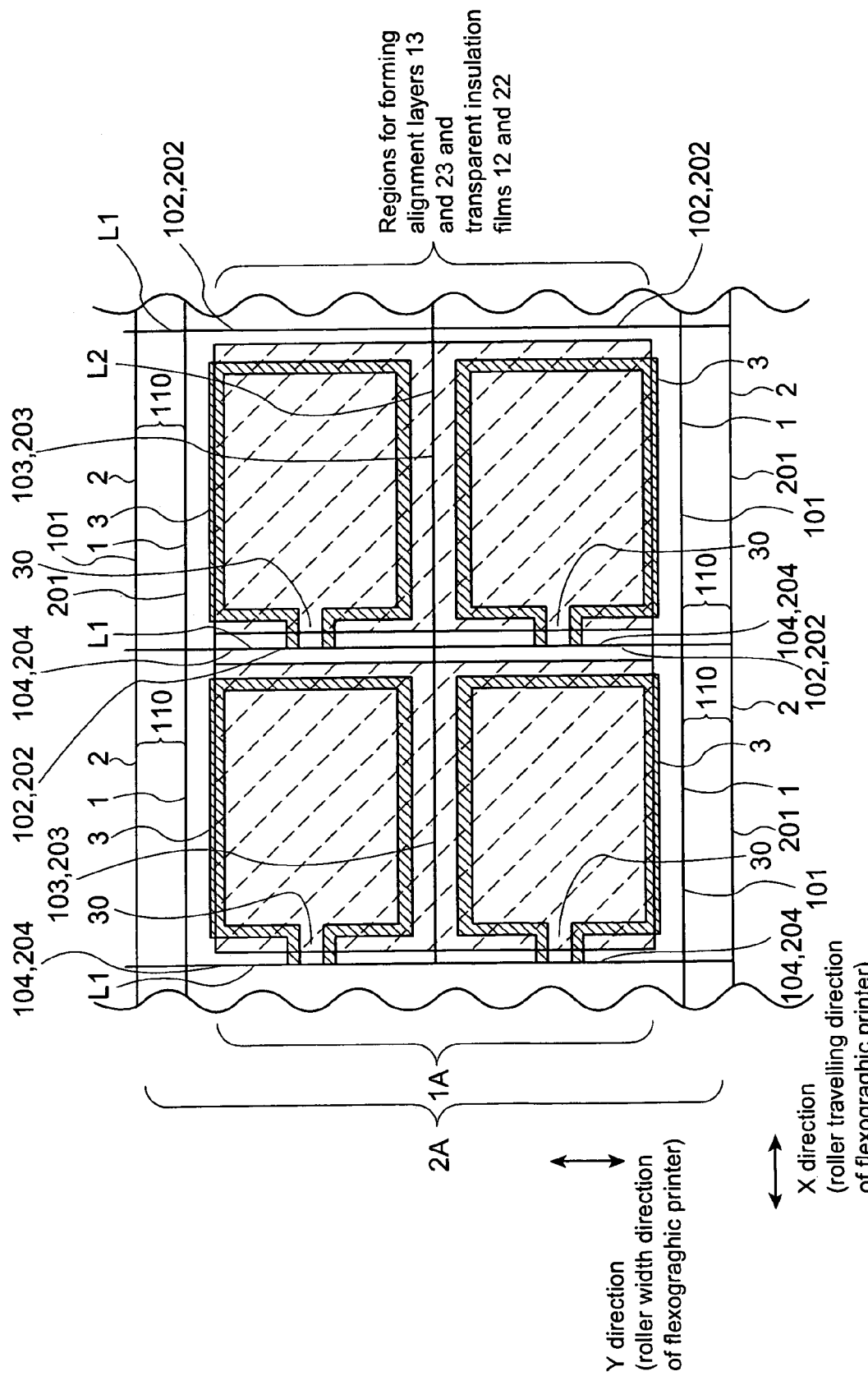
FIG. 9 is a schematic diagram which shows first and second large substrates for forming a plurality of first and second substrates, respectively, regions for forming transparent insulation films and alignment layers (regions marked by broken lines slanting to the left) formed on the first and second large substrates, and regions for forming the sealant (regions marked by solid lines slanting to the right) in the fabrication process of a liquid crystal panel in accordance with a third embodiment of the present invention.

FIG. 9 is a schematic diagram which shows first and second large substrates for forming a plurality of first and second substrates, respectively, regions for forming transparent insulation films and alignment layers (regions marked by broken lines slanting to the left) formed on the first and second large substrates, and regions for forming the sealant (regions marked by solid lines slanting to the right) in the fabrication process of a liquid crystal panel in accordance with a third embodiment of the present invention. Since the basic structure of the liquid crystal panel in this embodiment is in common with that of the liquid crystal panel in accordance with the first embodiment, the same numerals are used for the corresponding sections in FIG. 9, and the detailed description thereof will be omitted.

As shown in FIG. 9, in this embodiment, transparent insulation films 12 and 22 composed of silicon oxide films are formed on first and second large substrates 1A and 2A so as to cover electrodes 6A and 7A (refer to FIGS. 3, 4, 5(A), and 5(B)). Although the transparent insulation films 12 and 22 cover a cutting projection line L2 between cutting projection lines L1 and L2, they do not cover the cutting projection line L1, and the transparent insulation films 12 and 22 are formed in strip, covering a plurality of substrate forming-regions. As a result, when the first and second large substrates 1A and 2A are divided into single first and second substrates 1 and 2 by cutting along the cutting projection lines L1 and L2, in the sections corresponding to the four sides 101 to 104 and 201 to 204 of the first and second substrates 1 and 2, the transparent insulation films 12 and 22 are formed so as to be superposed on the regions for forming the sealant 3. In the sections corresponding to the sides 103 and 203 lying on the side of the cutting projection line L2, among the four sides 101 to 104 and 201 to 204 of the first and second substrates 1 and 2, the transparent insulation films 12 and 22 are formed up to the edges of the first and second substrates 1 and 2 across the regions for forming the sealant 3.

Polyimide films (alignment layers 13 and 23) are formed by flexographic printing so as to cover the transparent insulation films 12 and 22 in the first and second large substrates 1A and 2A. The polyimide films (alignment layers 13 and 23) also cover the cutting projection line L2 between the cutting projection lines L1 and L2 and the polyimide films do not cover the cutting projection line L1. The polyimide films are formed in strip over a plurality of substrate forming-regions. As a result, when the first and second large substrates 1A and 2A are divided into single first and second substrates 1 and 2 by cutting along the cutting projection lines L1 and L2, in the sections corresponding to the four sides 101 to 104 and 201 to 204 of the first and second substrates 1 and 2, the polyimide films (alignment layers 13 and 23) are formed so as to be superposed on the regions for forming the sealant 3. In the sections corresponding to the sides 103 and 203 lying on the aide of the cutting projection line L2, among the four sides 101 to 104 and 201 to 204 of the first and second substrates 1 and 2, the polyimide films (alignment layers 13 and 23) are formed up to the edges of the first and second substrates 1 and 2 across the regions for forming the sealant 3.

Fourth Embodiment

Figure 10:
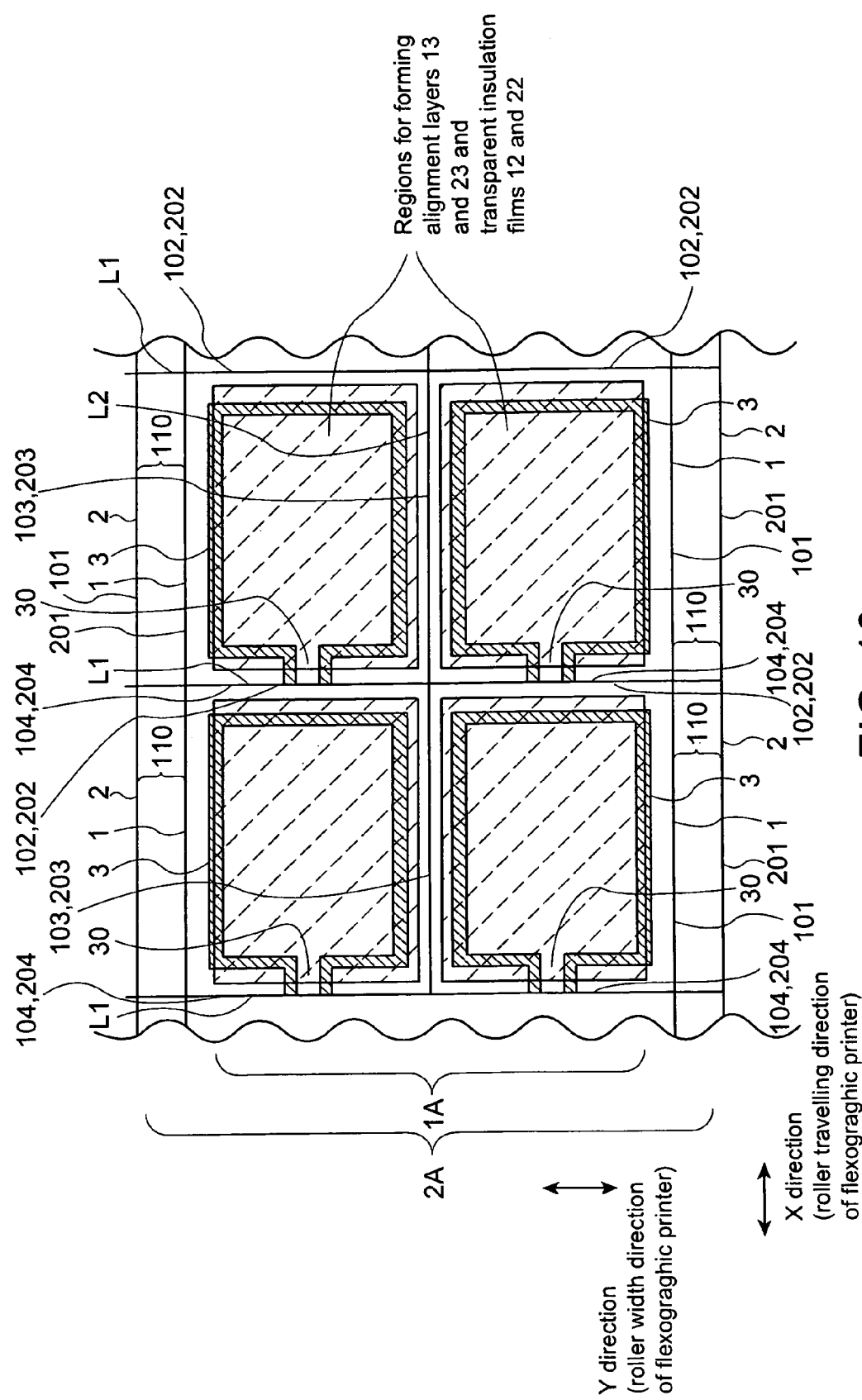
FIG. 10 is a schematic diagram which shows first and second large substrates for forming a plurality of first and second substrates, respectively, regions for forming transparent insulation films and alignment layers (regions marked by broken lines slanting to the left) formed on the first and second large substrates, and regions for forming the sealant (regions marked by solid lines slanting to the right) in the fabrication process of a liquid crystal panel in accordance with a fourth embodiment of the present invention.
Figure 11A:
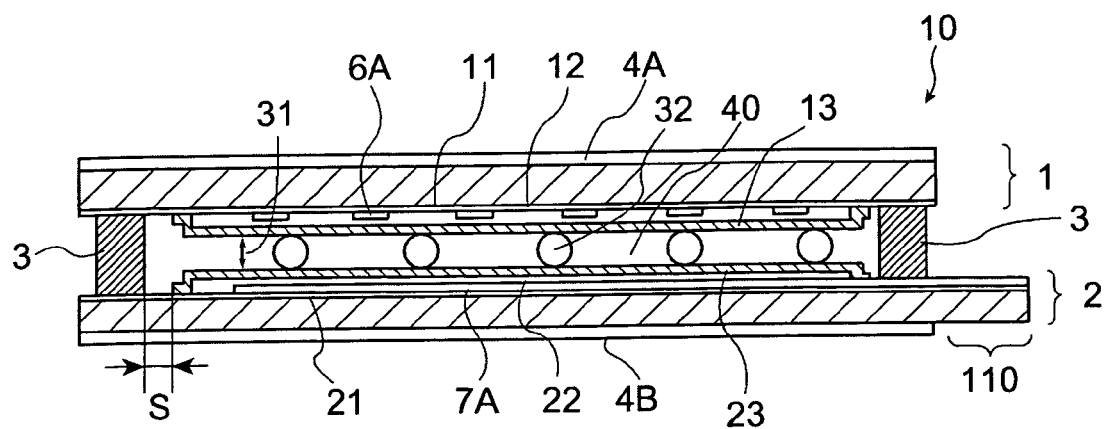
FIGS. 11(A) and 11(B) are a sectional view of a conventional liquid crystal panel and an enlarged sectional view of the end thereof, respectively.
Figure 11B:
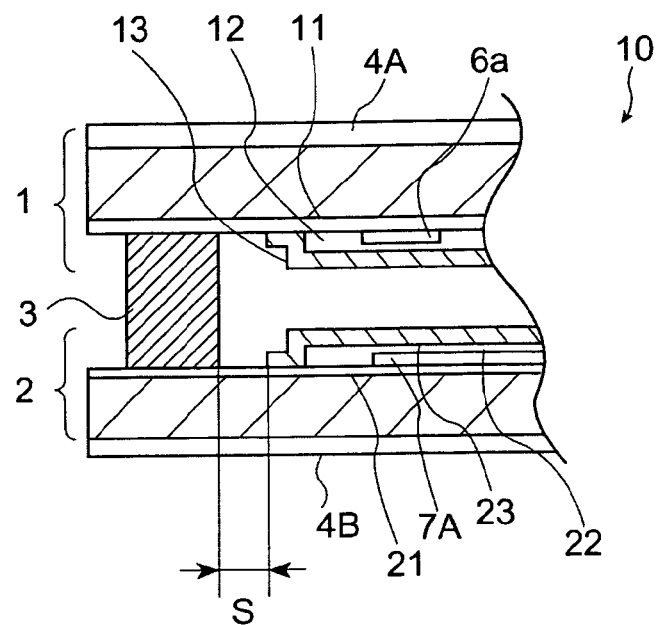
Figure 12:
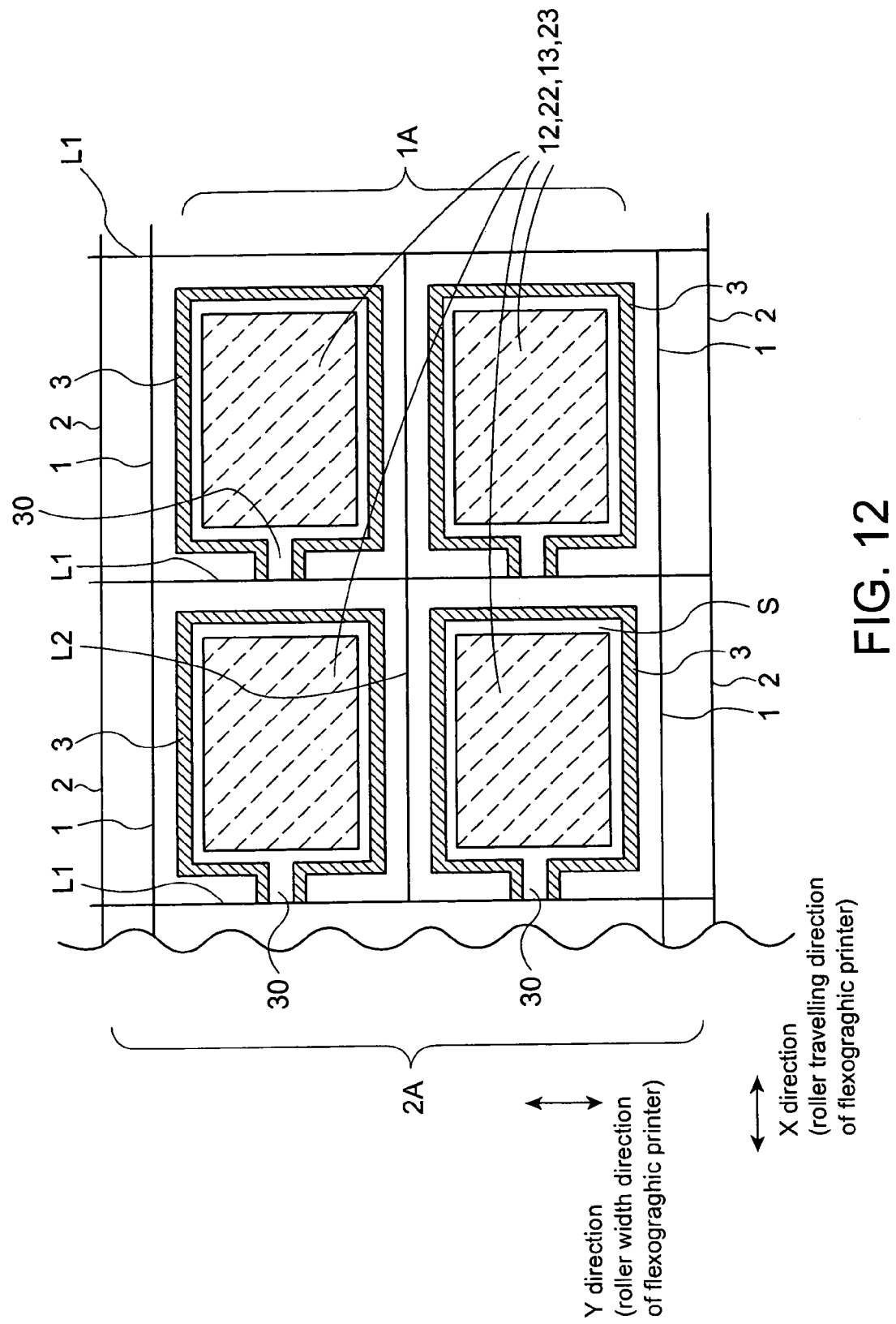
FIG. 12 is a schematic diagram which shows first and second large substrates for forming a plurality of first and second substrates, respectively, regions for forming transparent insulation films and alignment layers (regions marked by lines slanting to the left) formed on the first and second large substrates, and regions for forming the sealant (regions marked by lines slanting to the right) in the fabrication process of the conventional liquid crystal panel shown in FIGS. 11(A) and 11(B).

FIG. 10 is a schematic diagram which shows first and second large substrates for forming a plurality of first and second substrates, respectively, regions for forming transparent insulation films and alignment layers (regions marked by broken lines slanting to the left) formed on the first and second large substrates, and regions for forming the sealant (regions marked by solid lines slanting to the right) in the fabrication process of a liquid crystal panel in accordance with a fourth embodiment of the present invention. Since the basic structure of the liquid crystal panel in this embodiment is in common with that of the liquid crystal panel in accordance with the first embodiment, the same numerals are used for the corresponding sections in FIG. 10, and the detailed description thereof will be omitted.

As shown in FIG. 10, in this embodiment, transparent insulation films 12 and 22 composed of silicon oxide films are formed on first and second large substrates 1A and 2A so as to cover electrodes 6A and 7A (refer to FIGS. 3, 4, 5(A), and 5(B)). The transparent insulation films 12 and 22 do not cover cutting projection lines L1 and L2, and are formed independently by each substrate forming-region. However, when the first and second large substrates 1A and 2A are divided into single first and second substrates 1 and 2 by cutting along the cutting projection lines L1 and L2, in the sections corresponding to the four sides 101 to 104 and 201 to 204 of the first and second substrates 1 and 2, the transparent insulation films 12 and 22 are formed so as to be superposed on the regions for forming the sealant 3.

Polyimide films (alignment layers 13 and 23) are formed by flexographic printing so as to cover the transparent insulation films 12 and 22 in the first and second large substrates 1A and 2A. The polyimide films (alignment layers 13 and 23) do not cover the cutting projection lines L1 and L2, and are formed independently by each substrate forming-region. However, when the first and second large substrates 1A and 2A are divided into single first and second substrates 1 and 2 by cutting along the cutting projection lines L1 and L2, in the sections corresponding to the four sides 101 to 104 and 201 to 204 of the first and second substrates 1 and 2, the polyimide films (alignment layers 13 and 23) are formed so as to be superposed on the regions for forming the sealant 3.

Other Embodiments

Although, in any one of the embodiments described above, the transparent insulation films 12 and 22 and the polyimide films (alignment layers 13 and 23) are formed so as to be superposed on the regions for forming the sealant 3 at the four sides of the substrate, the transparent insulation films 12 and 22 and the polyimide films (alignment layers 13 and 23) may be superposed on the regions for forming the sealant 3 at least at the three sides of the substrate. For example, the regions for forming the transparent insulation films 12 and 22 and the polyimide films (alignment layers 13 and 23) may be formed in the interior of the regions for forming the sealant 3 at the sides 101 and 201 in which terminals 6A and 7A for conducting between substrates and input-output terminals 7D are formed, among the four sides 101 to 104 and 201 to 204 of the first and second substrates 1 and 2.

Although examples of passive matrix-type liquid crystal panels have been described, the present invention is also applicable to active matrix-type liquid crystal panels.

Furthermore, although, in accordance with the embodiments, alignment layers, etc. are formed in the stage of large substrates, and after the large substrates are bonded to each other, they are divided into single liquid crystal panels, the present invention is also applicable to the case in which electrodes, alignment layers, etc. are formed on single substrates.

INDUSTRIAL APPLICABILITY

As described above, in liquid crystal panels and methods for fabricating the same in accordance with the present invention, since alignment layers are formed up to the regions overlapping the regions for forming a sealant, there is no space between the sealant and the alignment layers. Therefore, a low twist domain does not occur in the vicinity of the inner periphery of the sealant, and the vicinity of the inner periphery of the sealant can be effectively used as the region for displaying images. Accordingly, the present invention is useful for liquid crystal display devices which require wider regions for displaying images and methods of fabricating the same, and in particular, the invention is suitable for a liquid crystal display device in which a larger amount of displaying is required by effectively using the limited region for displaying images.

What is claimed is:

1. A liquid crystal panel comprising:
   a pair of substrates bonded to each other by a sealant;
   a liquid crystal enclosed in an inner region delimited by the sealant between the pair of substrates;
   first electrodes formed on an inner side of a first substrate of the pair of the substrates;
   second electrodes formed on an inner side of a second substrate of the pair of substrates;
   terminals formed on the inner side of each of the pair of substrates for conducting between the substrates, the terminals being arranged in a sealant region on which the sealant is formed and connected through a conductive particle included in the sealant; and
   a first alignment layer formed on the first electrodes and covering the inner region delimited by the sealant;
   a second alignment layer formed on the second electrode and covering the inner region delimited by the sealant;
   wherein the first alignment layer and the second alignment layer are formed from the inner region to the sealant region, the first and second alignment layers partially overlapping the sealant region on which the sealant is formed along a side of the sealant provided with the terminals such that an edge of the first and second alignment layers terminates in the sealant region; and
   another edge of the first second alignment layers crosses over the sealant region to an outer side of the sealant along a side of the sealant other than the side provided with the terminals.

2. A liquid crystal panel according to claim 1, wherein the sealant is a one-part thermosetting epoxy sealant.

3. A liquid crystal panel according to claim 1, wherein the first and second alignment layers are formed up to a region overlapping the region for forming the sealant in the sections corresponding to the four sides of the substrate.

4. A liquid crystal panel according to claim 1, wherein the first and second alignment layers are formed up to edges of the substrates across the region for forming the sealant in the individual sides of the substrate excluding the sides provided with input-output terminals and the terminals for conducting between the substrates.

5. A liquid crystal panel according to claim 1, wherein the first and second alignment layers are formed up to edges of the substrates across the region for forming the sealant in the individual sides of the substrates excluding the side provided with the input-output terminals for conducting between the substrates.

6. A method of fabricating a liquid crystal panel defined in claim 1, wherein the first and second electrodes are formed on the surface of a large substrate for forming a plurality of pairs of substrates in individual regions for forming the substrates which are divided by cutting the large substrate along cutting projection lines, and then thin films for forming the first and second alignment layers are formed inside the region delimited by the sealant, and the first and second alignment layers are also formed to partially overlap the sealant in a region for conducting between the substrates and to cross the regions for forming the sealant in a region other than the region for conducting between the substrates.

7. A method of fabricating a liquid crystal panel according to claim 6, wherein the first and second electrodes are formed on the surface of the large substrate for forming a plurality of pairs of substrates in the individual regions for forming the substrates which are divided by cutting the large substrate along cutting projection lines, and then the films for forming the first and second alignment layers are formed on a plurality of substrate forming-regions including the cutting projection lines.

8. A method of fabricating a liquid crystal panel according to claim 7, wherein the first and second electrodes are formed on the surfaces of a pair of large substrates for forming a plurality of pairs of substrates in the regions for forming the individual substrates which are divided by cutting the large substrates along cutting projection lines, the thin films for forming the first and second alignment layers are formed on the plurality of substrate forming-regions including the cutting projection lines in each of the pair of large substrates, the sealant is formed on at least one of the pair of large substrates to bond the large substrates to each other, and the bonded large substrates are cut along the cutting projection lines.

9. A method of fabricating a liquid crystal panel according to claim 7, wherein, in the large substrate, the substrate forming regions are placed with a cutting projection line therebetween so that the sides provided with input-output terminals and terminals for conducting between substrates are directed in the opposite directions, and when the thin films for forming the first and second alignment layers are formed, the thin films are formed in stripes along the cutting projection line.

10. The liquid crystal panel according to claim 1, further comprising a transparent insulation film formed on the first and second electrodes so as to cover the inner region delimited by the sealant;
   wherein the first and second alignment layers are formed on the transparent insulation film, and the transparent insulation film and the first and second alignment layers are formed from the inner region to an intermediate portion of the sealant region on which the sealant is formed, along a side of the sealant provided with the terminals; and
   the transparent insulation film and the second alignment layer cross over the sealant region to an outer side of the sealant, along a side of the sealant other than the side provided with the terminals.

11. A liquid crystal panel comprising:
   a first substrate;
   first electrodes formed on said first substrate;
   a first alignment layer formed over said first electrodes;
   a second substrate;
   second electrodes formed on said second substrate;
   a second alignment layer formed over said second electrodes;
   a sealant formed in a sealant region, the sealant coupled between said first and second substrates so as to form a gap therebetween;
   terminals formed on an said first and second substrates for conducting between said first and second electrodes, the terminals being arranged in the sealant region and connected through a conductive particle included in the sealant;
   wherein each of said first and second alignment layers is formed on and covers an inner region delimited by the sealant;
   the first and second alignment layers are formed from the inner region to the sealant region, the first and second alignment layers partially overlapping the sealant region where the sealant is formed along a side of the sealant provided with the terminals such that an edge of the first and second alignment layers terminates in the sealant region; and
   another edge of the first and second alignment layers crosses over the sealant region to an outer side of the sealant along a side of the sealant other than the side provided with the terminals.

12. The liquid crystal panel of claim 11, wherein said first alignment layer is interposed between said sealant and said first substrate.

13. The liquid crystal panel of claim 11, wherein said second alignment layer is interposed between said sealant and said second substrate.

14. The liquid crystal panel of claim 11, wherein said first alignment layer extends to a perimeter of said first substrate.

15. The liquid crystal panel of claim 11, wherein said second alignment layer extends to a perimeter of said second substrate.

16. The liquid crystal panel of claim 11, wherein said side provided with said terminals for conducting between said first and second substrates includes input-output terminals.

17. The liquid crystal panel of claim 11, further comprising:
   a first transparent insulation film interposed between said first alignment layer and said first substrate over said first electrodes; and
   a second transparent insulation film interposed between said second alignment layer and said second substrate over said second electrodes, said first and second transparent insulation films complementing a configuration of said first and second alignment layers.

18. A method of fabricating a liquid crystal panel comprising:
   providing a pair of large substrates including a plurality of smaller substrate forming regions divided by a plurality of cutting lines, the liquid crystal panel fabricated by using each of the substrate forming regions;
   forming first electrodes on an inner side of a first substrate of the pair of large substrates;
   forming second electrodes on an inner side of a second substrate of the pair of large substrates;
   forming terminals on each of the smaller substrate forming regions on the inner side of each of the pair of large substrates for conducting between the substrates, the terminals being arranged in a sealant region on which a sealant is formed, the terminals being connected through a conductive particle included in the sealant, the sealant bonding the pair of large substrates for every smaller substrate forming region; and
   forming a first alignment layer on the first electrodes that cover an inner region delimited by the sealant;
   forming a second alignment layer on the second electrodes that cover an inner region delimited by the sealant;
   wherein the first and second alignment layers are formed from the inner region to the sealant region on which the sealant is formed, the first and second alignment layers partially overlapping the sealant region along a side of the sealant provided with the terminals such that an edge of the first and second alignment layers terminates in the sealant region; and
   another edge of the first and second alignment layers crosses over the sealant region to an outer side of the sealant along a side of the sealant other than the side provided with the terminals.

19. The method of claim 18, wherein said alignment layers are deposited so as to overlap said sealant region along each of said smaller substrate forming regions.

20. The method of claim 18, wherein said alignment layers are deposited so as to overlap said plurality of projected cutting lines.

21. The method of claim 18, further comprising depositing a sealant on said sealant region of each of said smaller substrate forming regions.

22. The method of claim 21, further comprising:
   bonding the pair of large substrates by securing said sealant to said sealant region along each of said smaller substrate forming regions on said substrates; and
   cutting said pair of substrates along said cutting lines.

23. The method of claim 18, further comprising a step of forming a transparent insulation film on the first and second electrodes so as to cover the inner region delimited by the sealant;
   wherein the first and second alignment layers are formed on the transparent insulation film, and the transparent insulation film and the first and second alignment layers are formed from the inner region to an intermediate portion of the sealant region on which a sealant is formed, along a side of the sealant provided with the terminals; and
   the transparent insulation film and the second alignment layer cross over the sealant region to an outer side of the sealant, along a side of the sealant other than the side provided with the terminals.

24. A liquid crystal panel comprising:
a pair of substrates bonded to each other by a sealant with a predetermined gap therebetween;
a liquid crystal enclosed in a region delimited by the sealant between the pair of substrates;
first electrodes formed on an inner side of a first substrate of the pair of the substrates for controlling an alignment state of the liquid crystal;
second electrodes formed on an inner side of a second substrate of the pair of the substrates for controlling the alignment state of the liquid crystal;
terminals formed on the inner side of each of the pair of substrates for conducting between the substrates, the terminals being arranged in a sealant region on which the sealant is formed, and the terminals being connected through a conductive particle included in the sealant; and
a first alignment layer formed on the first electrodes and covering the inner region delimited by the sealant;
a second alignment layer formed on the second electrodes and covering the inner region delimited by the sealant;
wherein the first and second alignment layers are formed from the inner region to the sealant region, and partially overlap the sealant region along a side of the sealant provided with the terminals such that an edge of the first and second alignment layers terminates in the sealant region; and
another edge of the first and second alignment layers crosses over the sealant region to an outer side of the sealant along a side of the sealant other than the side provided with the terminals.

25. A liquid crystal panel comprising:
a first substrate;
first electrodes formed on an inner side of said first substrate;
a first alignment layer formed on said first electrodes;
a second substrate;
second electrodes formed on an inner side said second substrate;
a second alignment layer formed on said second electrodes; and
terminals formed on the inner side of said first and second substrates for conducting between said first and second electrodes, the terminals being arranged in a sealant region on which a sealant is formed and connected through a conductive particle included in a sealant;
wherein the sealant is coupled between said first and second substrates so as to form a gap therebetween;
each of said first and second alignment layers are formed inside of and covers an inner region delimited by the sealant;
said first and second alignment layers are formed from the inner region to the sealant region and partially overlap the sealant region such that an edge of said first and second alignment layers terminates in the sealant region along a side of the sealant provided with the terminals; and
another edge of said first and second alignment layers crosses the sealant region to an outer side of the sealant along a side of the sealant other than the side provided with said terminals.

* * * * *